(12) United States Patent
Kamboj et al.

(10) Patent No.: US 9,494,458 B2
(45) Date of Patent: Nov. 15, 2016

(54) FLUID LEVEL MEASUREMENT PROBE

(71) Applicant: Toyota Motor Engineering & Manufacturing North America, Inc., Erlanger, KY (US)

(72) Inventors: Amandip Singh Kamboj, Brampton (CA); Daniel Parker Zachry, Florence, KY (US); Edmund Tai, Woodstock (CA)

(73) Assignee: Toyota Motor Engineering & Manufacturing North America, Inc., Erlagner, KY (US)

( * ) Notice: Subject to any disclaimer, the term of this patent is extended or adjusted under 35 U.S.C. 154(b) by 225 days.

(21) Appl. No.: 14/147,011

(22) Filed: Jan. 3, 2014

(65) Prior Publication Data

US 2015/0192451 A1 Jul. 9, 2015

(51) Int. Cl.
*G01F 23/00* (2006.01)
*G01F 23/296* (2006.01)

(52) U.S. Cl.
CPC .................................. *G01F 23/296* (2013.01)

(58) Field of Classification Search
None
See application file for complete search history.

(56) References Cited

U.S. PATENT DOCUMENTS

| | | | |
|---|---|---|---|
| 3,184,969 A | 5/1965 | Bolton | |
| 4,964,090 A | 10/1990 | McCarthy | |
| 5,317,908 A * | 6/1994 | Fitzgerald | G01N 11/162 73/54.25 |
| 6,734,689 B1 * | 5/2004 | Yang | G01R 1/06772 324/755.02 |
| 8,656,759 B2 * | 2/2014 | Hughes | G01N 3/42 73/78 |
| 2005/0181328 A1 * | 8/2005 | Milne | A61C 17/20 433/119 |
| 2010/0241397 A1 * | 9/2010 | Fischer | G01B 7/105 702/170 |
| 2013/0118252 A1 | 5/2013 | Hartmann | |

FOREIGN PATENT DOCUMENTS

WO    WO2013083700    6/2013

\* cited by examiner

*Primary Examiner* — Andre Allen
(74) *Attorney, Agent, or Firm* — Christopher G. Darrow; Darrow Mustafa PC

(57) ABSTRACT

A probe operable to measure a fluid level including a tip movably mounted to a housing, the tip including a multiple of steps and a sensor mounted within the housing, the sensor selectively activated in response to movement of the tip toward the housing. A method of measuring a fluid within a chamber of a vehicle includes locating a probe with a tip including a multiple of steps into a fill port of a chamber, only one of the multiple of steps associated with the fill port; and pressing the probe toward the fill port such that a sensor within the probe is selectively activated in response to movement of the tip toward the housing, the sensor determining a distance to a fluid within the chamber.

18 Claims, 6 Drawing Sheets

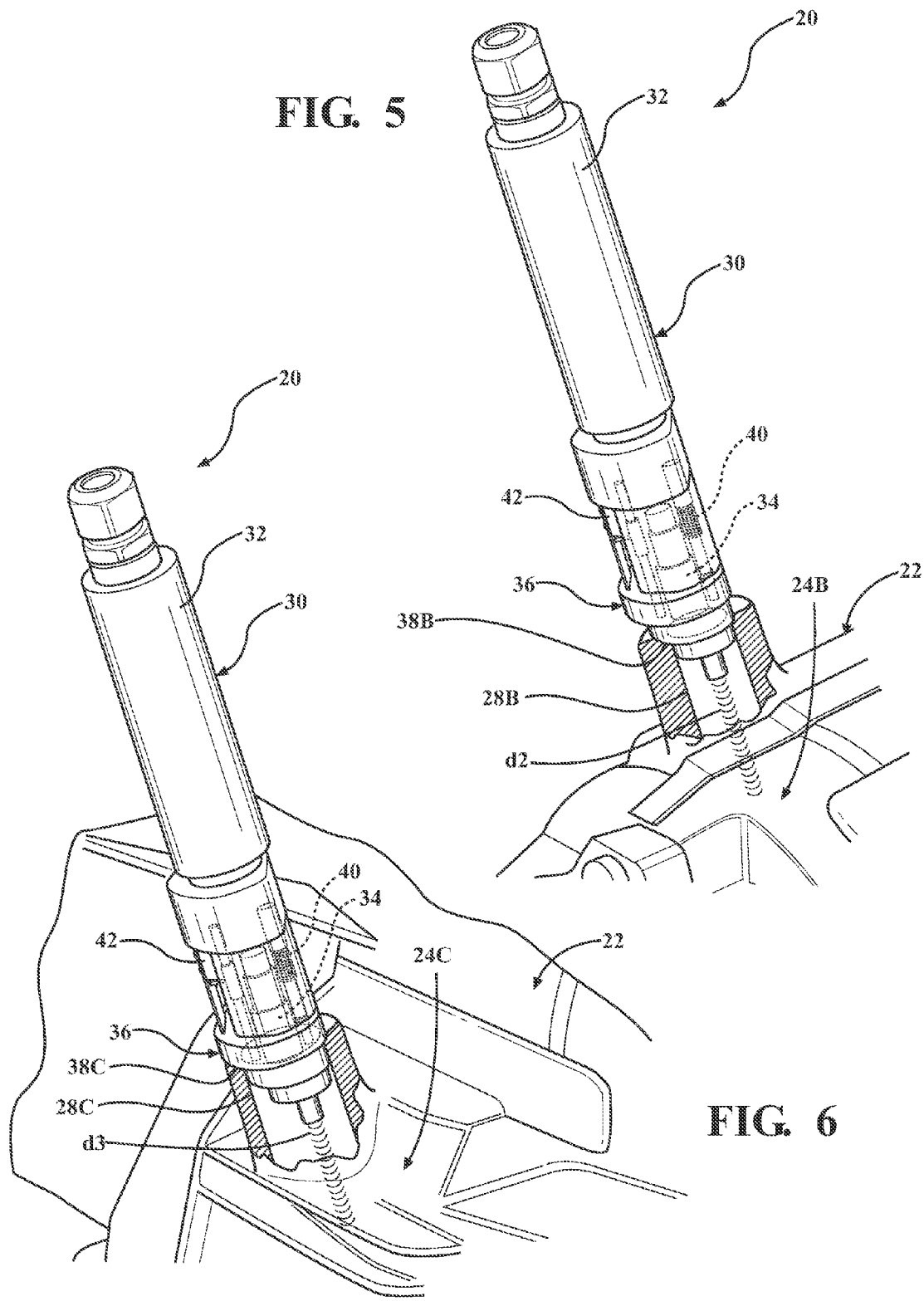

FLUID LEVEL MEASUREMENT PROBE

BACKGROUND

The present disclosure relates to equipment useful in the manufacture and repair of a vehicle, and more particularly to measurement of fluid levels therein.

Various equipment useful in the manufacture and repair of a vehicle is often provided to confirm proper fluid fill levels within a chamber such as that within a vehicle transaxle. Confirmation has traditionally been performed with either fiber optic or air pressure probes.

Dependent on access, sufficient space may be provided for two fiber optic probes to confirm that the fluid fill level is between a desired upper and a lower fluid limit. Otherwise, access for a single fiber optic probe provides a go or no-go signal. Since fiber optic check probes operate via direct fluid contact, each probe is typically dedicated to a particular usage to avoid contamination between different fluid types, however, even if the fluid type is the same, a dedicated probe is required to verify each specific fluid level. Also, due in part to contact with the fluid, fiber optic probe elements are subject to wear that requires preventative maintenance to ensure proper functionality.

Air pressure probes utilize backpressure from the liquid within a chamber to detect the presence of an acceptable fluid volume. Air pressure probes require an airtight interface with the fluid to ensure proper operation that necessitates a dedicated probe specific to each fill port. Air pressure probes also result in fluid contact that again requires separate dedicated probes for each specific fluid type and fluid level.

Although effective, such conventional probes typically only confirm a threshold fluid level. Further, dedicated probes are required for each fluid type and level to be checked.

SUMMARY

A probe operable to measure a fluid level according to one disclosed non-limiting embodiment of the present disclosure includes a housing; a tip movably mounted to the housing, the tip including a multiple of steps; and a sensor mounted within the housing, the sensor selectively activated in response to movement of the tip toward the housing.

A fluid measurement system, according to another disclosed non-limiting embodiment of the present disclosure includes a first chamber with a first fill port; a second chamber with a second fill port of a diameter different than the first fill port; and a probe with a tip movably mounted to a housing, the tip including a multiple of steps of which only one of the multiple of steps is associated with the first fill port and only another one of the multiple of steps is associated with the second fill port.

A method of measuring a fluid within a chamber of a vehicle according to another disclosed non-limiting embodiment of the present disclosure includes locating a probe with a tip including a multiple of steps into a fill port of a chamber, only one of the multiple of steps associated with the fill port; and pressing the probe toward the fill port such that a sensor within the probe is selectively activated in response to movement of the tip toward the housing, the sensor determining a distance to a fluid within the chamber.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 5 is an expanded view of the fluid level measurement probe in use with a second chamber;

FIG. 6 is an expanded view of the fluid level measurement probe in use with a third chamber;

DETAILED DESCRIPTION

Figure 1:
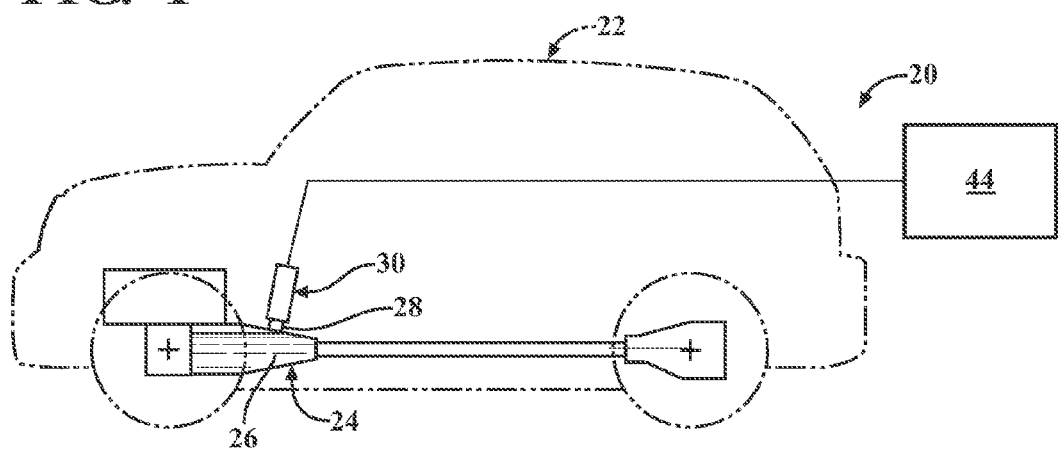
FIG. 1 is a schematic view of a vehicle for use with a fluid level measurement probe system.
Figure 2:
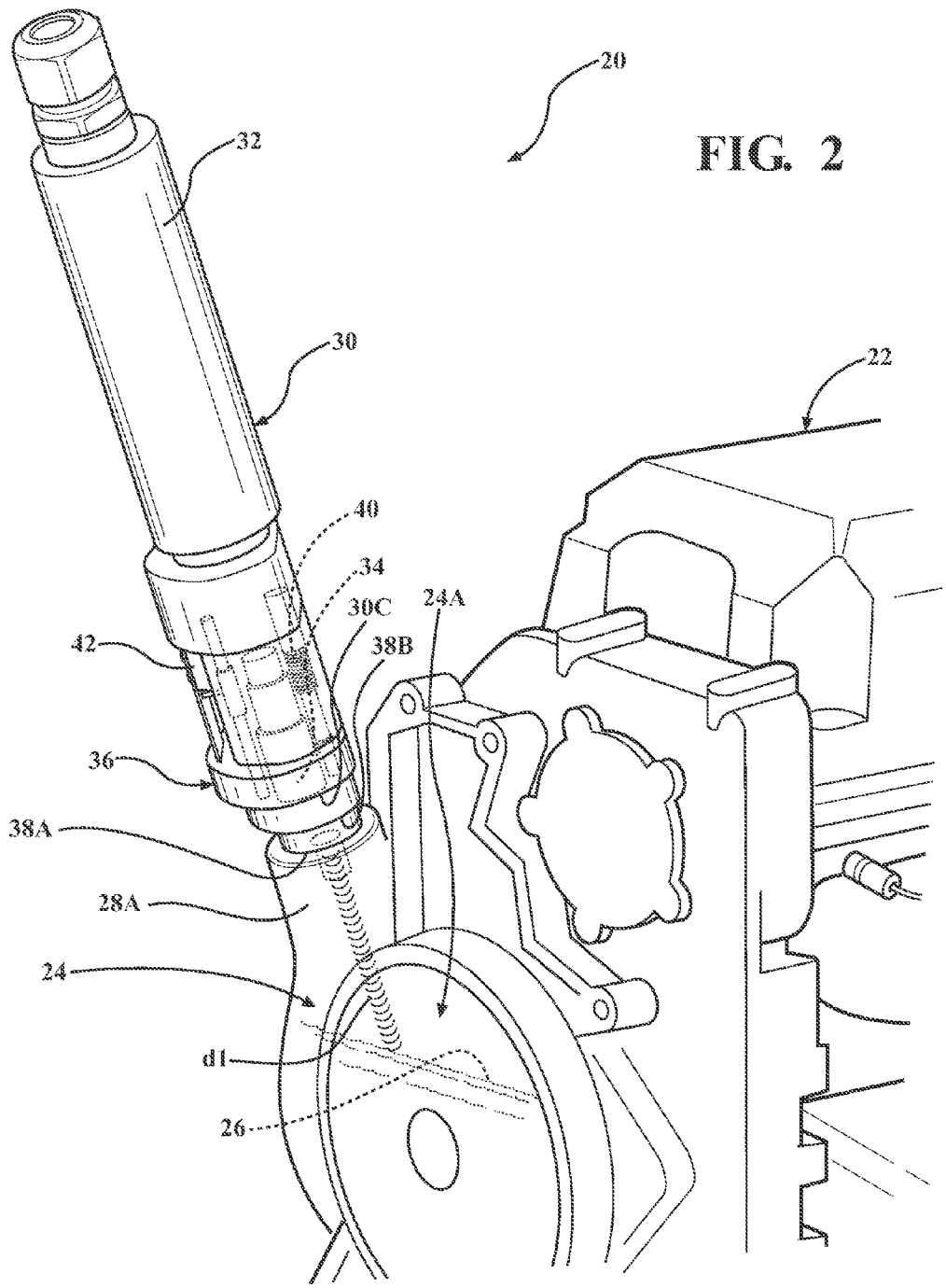
FIG. 2 is an expanded view of the fluid level measurement probe in use with a first chamber.

FIG. 1 schematically illustrates selected portions of a fluid measurement system 20 for a vehicle 22 with a chamber 24 that contains a fluid 26. Such chambers 24 are often provided within, for example, a vehicle transaxle, differential, engine or other vehicle system. Further, other chambers may include tanks that contain other fluids such as hydraulic fluid, oils, or others. The chamber 24 may be filled through a fill port 28 that is often of different sizes and locations dependent on, for example, the vehicle or the vehicle system. The fill port 28 provides access for a probe 30 (FIG. 2).

Figure 3:
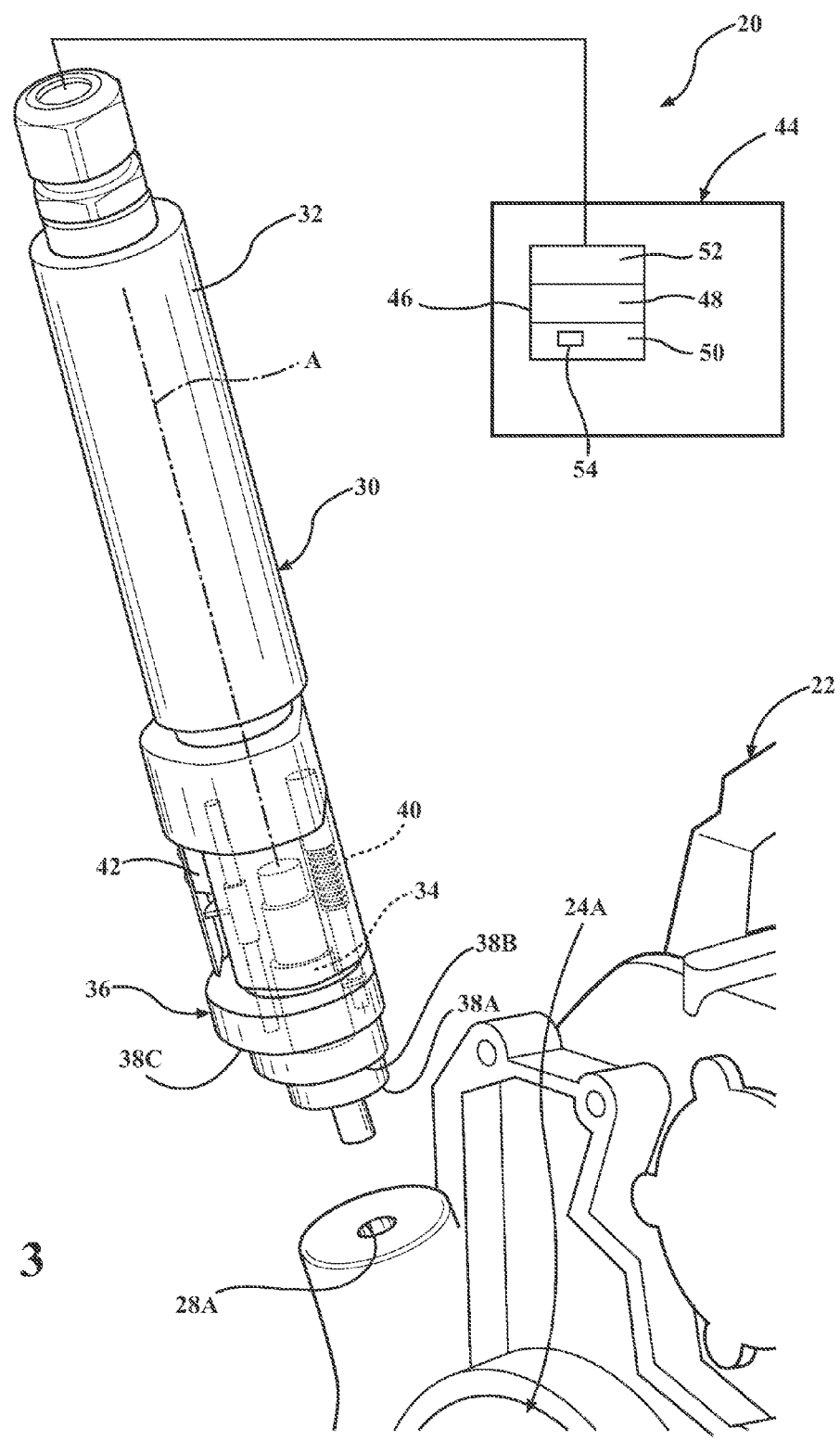
FIG. 3 is an expanded view of the fluid level measurement probe system according to one disclosed non-limiting embodiment.
Figure 4:
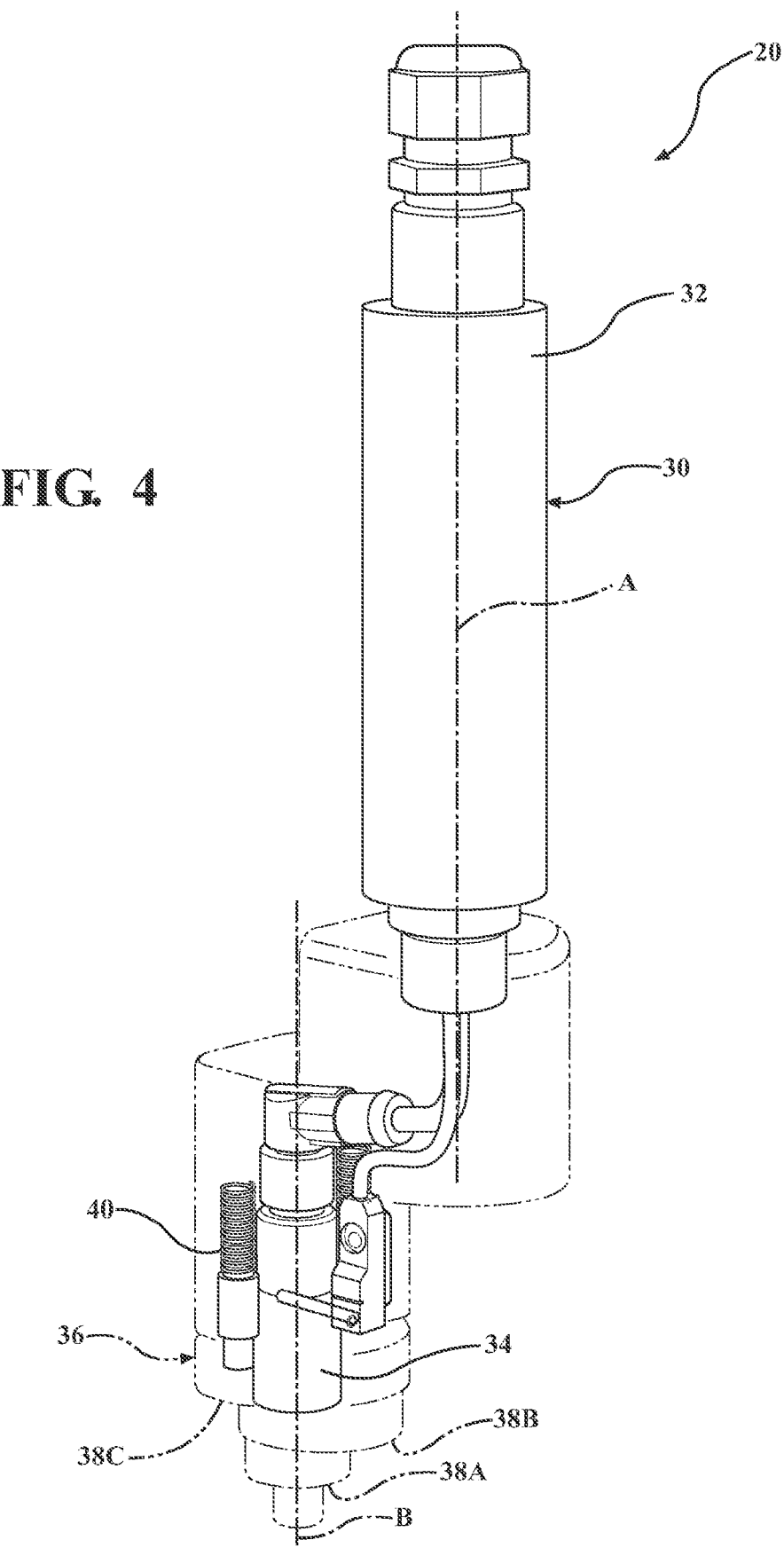
FIG. 4 is an expanded view of the fluid level measurement probe system according to one disclosed non-limiting embodiment.

With reference to FIG. 3, the probe 30, according to one disclosed non-limiting embodiment, generally includes a housing 32 that contains a sensor 34 for communication though a tip 36. It should be appreciated that various sensors such as an ultrasonic sensor, a laser sensor, a triangulation laser sensor or other may be utilized. It should also be appreciated that although the tip 36 and sensor 34 are generally collinear with regard to the housing 32 along a common axis A, angled or other arrangements such as an offset tip arrangement in which the tip 36 is on an axis B parallel to the axis A of the housing 32 (FIG. 4) may alternatively be provided.

The tip 36 includes a multiple of steps (three shown as 38A, 38B, 38C). Each of the steps 38A, 38B, 38C is sized with respect to a diameter of a specific fill port 28A (FIG. 2), 28B (FIG. 5), 28C (FIG. 6). In one example, the fill port 28A may be about 10mm in diameter. Each of the steps 38A, 38B, 38C is sized to be received into a fill port 28A, 28B, 28C such that each step 38A, 38B, 38C provides a particular individual distance datum. Each fill port 28A, 28B, 28C is associated with, for example, a particular chamber 24A, 24B, 24C such as that of a predetermined particular transaxle type, fluid volume, fluid type or other distinguishing characteristic. In one example, the chamber 24A may be of about 300 ml. That is, each fill port 28A, 28B, 28C is related to a particular chamber 24A, 24B, 24C of a particular known volume.

Each of the multiple of steps 38A, 38B, 38C increases in diameter from a distal end of the tip 36 toward the housing 32 to operate as a datum guide for an associated chamber 24A, 24B, 24C to confirm a specific fluid level for that chamber 24A, 24B, 24C. That is, an operator inserts the tip 36 into a fill port 28A, 28B, 28C and the appropriate step 38A, 38B, 38C necessarily interfaces therewith (see FIGS. 2, 5, 6). It should be appreciated that any number of steps may be provided.

With continued reference to FIG. 3, the tip 36 is movably mounted to the housing 32 and biased therefrom. A bias member 40, such as a spring, biases the tip 36 away from the housing 32 along the axis A. Pressure on the probe 30 when the tip 36 is within the port 28 that overcomes the bias of the bias member 40, moves the tip 36 toward the housing 32. It should be appreciated that the bias member 40 may be of strength to assure a positive interface between the tip 36 and the port 28 and that "toward" includes but is not limited to coaxial movement.

Figure 7:
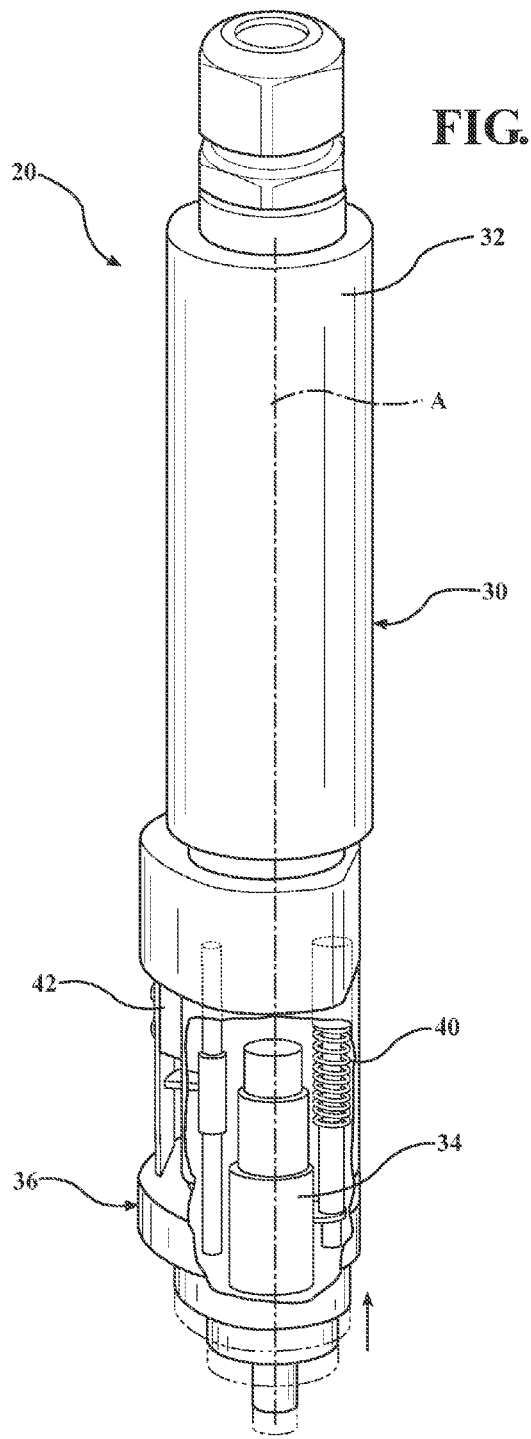
FIG. 7 is an expanded view of the fluid level measurement probe system in an activated configuration.

Movement of the tip 36 toward the housing 32 (FIG. 7) selectively activates an actuator 42 such as a proximity switch, limit switch, micro switch or other that operates as a trigger for the sensor 34. Insertion of the tip 36 into the fill port 28A and pressure on the probe 30 drives the tip 36 toward the housing 32 to thereby activate the actuator 42 and operate the sensor 34. That is, the sensor 34 is activated in response to proper probe 30 insertion into the fill port 28A. It should be appreciated that various mechanical and/or electronic mechanisms may be utilized as a trigger for actuation of the sensor 34. The sensor 34 fires and detects a distance to the fluid 26 for communication to a control subsystem 44.

Proper probe 30 insertion facilitates confirmation of a proper reference datum so that data such as a distance (illustrated schematically by arrow dl) measured by the sensor 34 provides accurate fluid height determination for use by the control subsystem 44. The sensor 34 determines the distance to the fluid 26 without direct contact with the fluid 26 such that the probe 30 may be used for multiple chambers 24 without fluid cross-contamination. One example type of sensor 34 measures distance to the fluid 26 and provides accuracy to about 1 mm.

Figure 8:
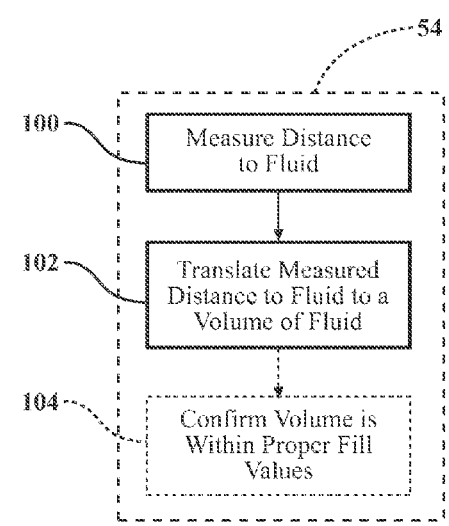
FIG. 8 is a method of using the fluid level measurement probe system according to one disclosed non-limiting embodiment.

The control subsystem 44 generally includes a control module 46 with a processor 48, a memory 50, and an interface 52. The processor 48 may be any type of microprocessor having desired performance characteristics. The memory 50 may include any type of computer readable medium which stores the data and control algorithms described herein such as a fluid measurement check algorithm 54 (FIG. 8). The functions of the algorithm 54 are disclosed in terms of functional block diagrams, and it should be understood by those skilled in the art with the benefit of this disclosure that these functions may be enacted in either dedicated hardware circuitry or programmed software routines capable of execution in a microprocessor based electronics control embodiment. Other operational software for the processor 48 may also be stored in the memory 50 to provide both manual and automatic Programmable Logic Controller (PLC) inputs. The interface 52 facilitates communication with other subsystems such as the sensor 34. It should be appreciated that the control subsystem 34 may be centralized or distributed. It should also be appreciated that various control inputs may be alternatively or additionally provided.

With reference to FIG. 8, the control subsystem 44 receives the distance, e.g., dl, d2, d3, etc., measured by the sensor 34 (step 100) and translates the data to provide an accurate fluid volume determination based on predetermined chamber 24 features (step 102). "Translation" as defined herein may include logic or instructions within the control module 46 that utilizes data such as the type of vehicle 22, transaxle volume, fill port position 28 and/or other data in combination with the distance measurement generated by the sensor 34 to determine a fluid volume within the specific chamber 24. That is, the control subsystem 44 may automatically associate each step 38A, 38B, 38C with the associated fill port 28A, 28B, 28C in an automated environment such as an assembly line environment or may alternatively or additionally receive an operator input as to which step 38A, 38B, 38C is to be the datum in, for example, a service environment. The resultant fluid volume may optionally then be compared and cross-checked with other assembly line systems (step 104) such as the assembly line fluid fill equipment (not shown), which typically have a volume dispensed display to confirm proper fluid fills.

The probe 30 detects the fluid 26 in the respective chamber 24 without direct contact with the fluid 26. This allows for one single probe 30 to be used to measure/check fluid volume of various chambers 24 irrespective of the fluid type and also reduces the risk of fluid contamination. That is, the probe 30 is readily available for use with three example chambers 24A, 24B, 24C, each of which have different fill port 28A, 28B, 28C associated with the three steps 38A, 38B, 38C. Furthermore, the fluid measurement check algorithm 54 may be modified via, for example, a software update, to permit volume calculations which relate one or more of the steps 38A, 38B, 38C with still other fluid chambers 24. The probe 30, being non-contact, is also less subject to wear which minimizes— or eliminates-significant preventative maintenance as in the case of fiber optics.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A fluid measurement system, comprising:
    a probe including:
        a housing;
        a tip movably mounted to said housing, said tip having a distal end, and including a multiple of steps that increase in diameter from said distal end toward said housing; and
        a non-contact distance sensor mounted within said housing in a location for taking distance measurements through an inside of said tip and out said distal end, said sensor selectively activated in response to movement of said tip toward said housing.

2. The system as recited in claim 1, wherein said distance sensor is an ultrasonic sensor.

3. The system as recited in claim 1, further comprising a control subsystem operable to convert measured distance data from said distance sensor to calculated volume data.

4. The system as recited in claim 1, wherein said tip is spring-biased away from said housing.

5. The system as recited in claim 1, wherein each of said multiple of steps is associated with a respective fill port of a chamber within which a fluid volume is to be measured.

6. The system as recited in claim 5, further comprising a control subsystem operable to convert measured distance data from said distance sensor with respect to said respective fill port to calculate the fluid volume within said chamber.

7. The system as recited in claim 1, wherein said tip, said housing and said distance sensor are arranged along a common axis.

8. A fluid measurement system, comprising:
    a first chamber with a first fill port of a first diameter;
    a second chamber with a second fill port of a second diameter different than said first diameter;
    a probe with a tip movably mounted to a housing, said tip having a distal end, and including a multiple of steps that increase in diameter from said distal end toward said housing, of which only one of said multiple of steps is associated with said first fill port and only another one of said multiple of steps is associated with said second fill port; and
    a non-contact distance sensor mounted within said housing in a location for taking distance measurements through an inside of said tip and out said distal end, said distance sensor selectively activated in response to movement of said tip toward said housing as said tip is at least partially inserted into either of said first fill port and said second fill port.

9. The system as recited in claim 8, wherein said distance sensor is an ultrasonic sensor.

10. The system as recited in claim 8, further comprising a control subsystem operable to convert measured distance data from said distance sensor to calculated volume data.

11. The system as recited in claim 8, further comprising a control subsystem operable to convert measured distance data from said distance sensor with respect to said either of said first fill port and said second fill port to calculated volume data of the fluid within its respective chamber.

12. A method of measuring a fluid within a chamber of a vehicle comprising: locating a probe with a tip movably mounted to a housing, the tip having a distal end, and including a multiple of steps that increase in diameter from the distal end toward the housing, into a fill port of a chamber, only one of the multiple of steps associated with the fill port; and pressing the probe toward the fill port such that a non-contact distance sensor mounted within the housing in a location for taking distance measurements through an inside of the tip and out the distal end is selectively activated in response to movement of the tip toward the housing, the distance sensor taking a distance measurement to a fluid within the chamber without contact with the fluid.

13. The method as recited in claim 12, further comprising:
    determining, based on measured distance data from the distance sensor, the distance to the fluid within the chamber.

14. The method as recited in claim 12, wherein the distance sensor is an ultrasonic sensor.

15. The method as recited in claim 13, further comprising:
    converting the distance to the fluid within the chamber to a volume of fluid within the chamber.

16. The method as recited in claim 12, further comprising:
    biasing the tip away from the housing with a spring bias.

17. The method as recited in claim 16, further comprising:
    overcoming the spring bias in response to pressing the probe toward the fill port.

18. The system as recited in claim 8, wherein said tip is spring-biased away from said housing.

* * * * *